United States Patent
Estévez Álvarez et al.

(10) Patent No.: US 8,122,784 B2
(45) Date of Patent: Feb. 28, 2012

(54) COVER ASSEMBLY FOR A MOTOR VEHICLE GEARSHIFT ASSEMBLY

(75) Inventors: Sergi Estévez Álvarez, Mollet del Vallès (ES); Toni Boada Cristòfol, Mollet del Vallès (ES)

(73) Assignee: Fico Triad, S.A., Mollet del Vallès (Barcelona) (ES)

( * ) Notice: Subject to any disclaimer, the term of this patent is extended or adjusted under 35 U.S.C. 154(b) by 209 days.

(21) Appl. No.: 12/513,286

(22) PCT Filed: Oct. 31, 2007

(86) PCT No.: PCT/EP2007/061790
§ 371 (c)(1),
(2), (4) Date: May 1, 2009

(87) PCT Pub. No.: WO2008/053028
PCT Pub. Date: May 8, 2008

(65) Prior Publication Data
US 2010/0064843 A1  Mar. 18, 2010

(30) Foreign Application Priority Data
Nov. 2, 2006 (ES) .................................. 06123404

(51) Int. Cl.
*G05G 1/00* (2006.01)
(52) U.S. Cl. ........................................................ 74/566
(58) Field of Classification Search ................. 74/473.1, 74/473.18, 566, 567; 116/28.1
See application file for complete search history.

(56) References Cited

U.S. PATENT DOCUMENTS

| 4,446,809 | A | * | 5/1984 | Dennis ........................ 116/28.1 |
| 5,848,855 | A | | 12/1998 | Roossien |
| 6,295,886 | B1 | | 10/2001 | Russell |
| 7,571,661 | B2 | * | 8/2009 | Blondeel et al. ............. 74/473.1 |

FOREIGN PATENT DOCUMENTS

| EP | 0279087 A1 | 8/1988 |
| EP | 0875699 A1 | 4/1998 |
| FR | 2840700 A1 | 12/2003 |
| FR | 2868996 A1 | 10/2005 |
| JP | 9156396 A | 6/1997 |
| WO | WO2004029482 A1 | 4/2004 |

OTHER PUBLICATIONS

Notification of Transmittal of the International Search Report and the Written Opinion of the International Searching Authority, or the Declaration, Feb. 13, 2008, European Patent Office.

* cited by examiner

*Primary Examiner* — Vicky Johnson
(74) *Attorney, Agent, or Firm* — Peter B. Scull; K M Kalan; Berenbaum Weinshienk PC

(57) ABSTRACT

It comprises a shifter bezel (3) movable between two end positions relative to a base (2) fixed to the vehicle and biasing means for biasing the shifter bezel (3) to one of said end positions and locking means (10) for locking the shifter bezel (3) at any position between said two end positions with respect to the base (2).
The shifter bezel (3) may be automatically self-adjusted in the vehicle console through the biasing means. Once the shifter bezel has been properly fitted, its relative position may be easily fixed by the locking means (10).

8 Claims, 5 Drawing Sheets

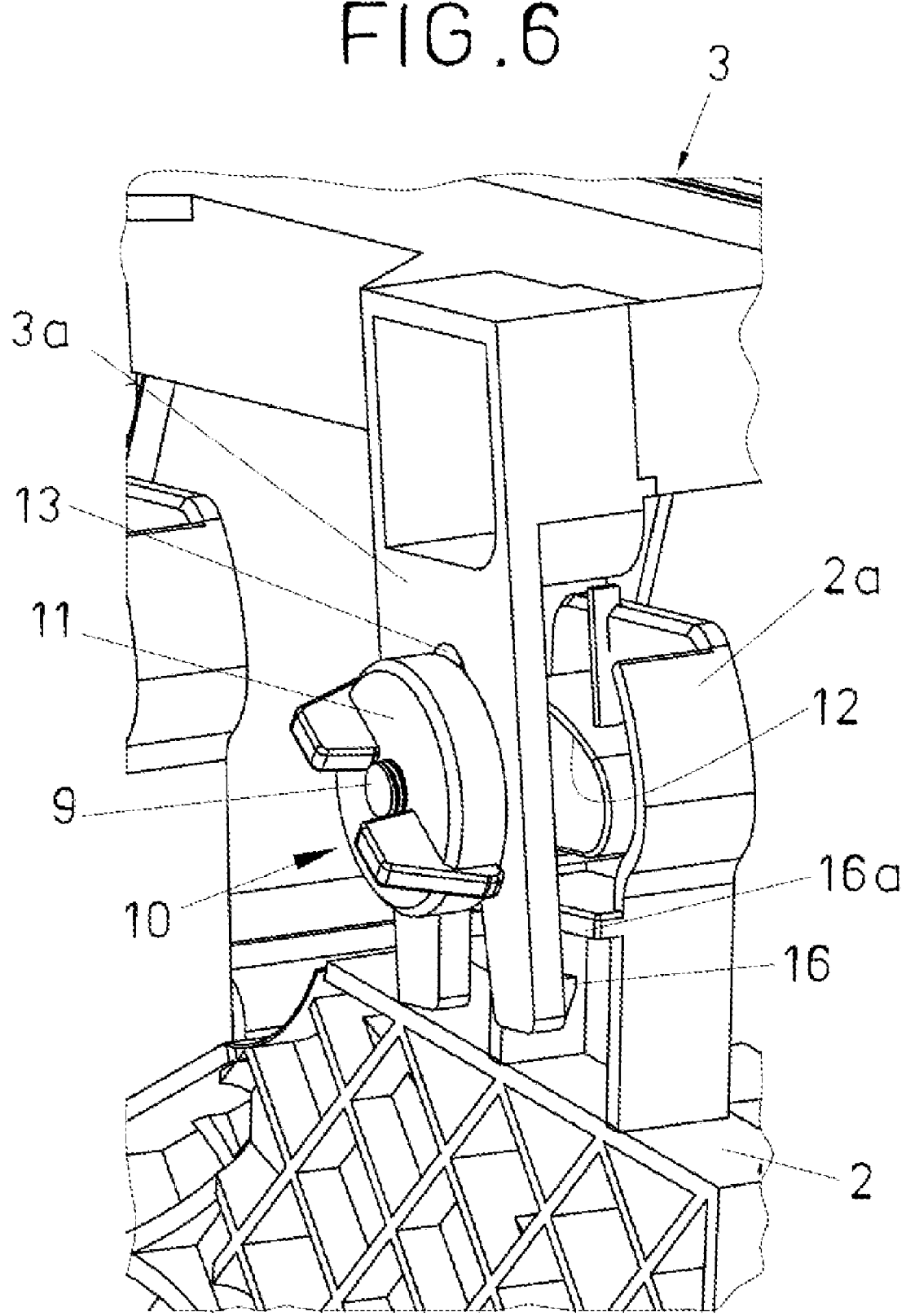

COVER ASSEMBLY FOR A MOTOR VEHICLE GEARSHIFT ASSEMBLY

FIELD OF THE INVENTION

The present invention relates to a cover assembly for covering the upper part of the base in a motor vehicle gearshift assembly specially, but not limited to, automatic gearshift systems. The cover assembly of the invention comprises a shifter bezel (a cover element having a groove through which the shifter lever is allowed to run) that can be displaced between two end positions relative to the base, said base being fixed to the vehicle.

BACKGROUND ART

A motor vehicle gearshift system, whether it is manually or automatically operated, typically comprises a cover assembly consisting of a base intended for concealing the gearbox mechanism. The base is covered by a console that is typically arranged on or coplanar to a shifter bezel. The shifter bezel has a groove formed therein through which a gearshift lever passes and moves for operating the gearshift mechanism.

U.S. Pat. No. 5,848,855 discloses a cover arrangement for covering a transmission shifter for a vehicle. The cover arrangement includes a lower cover having recesses and apertures with teeth and pressure tabs, and an upper cover mating with the lower cover having protrusions shaped to extend into the apertures. The protrusions have a rough surface on one side for engaging the tooth of the aperture corresponding thereto, and a smooth surface on another side for slidably engaging the pressure tab of the corresponding aperture. A desired force of engagement is present regardless of the depth of engagement of each respective protrusion into the respective aperture.

JP9156396 refers to a mounting structure comprising a cover and a base plate. The cover has first engaging parts with an engagement hole and elastic pieces formed integrally therein. The base plate has first engaged parts with an engaging projection and a stopper wall formed therein. The first engaging parts are engaged with each other by fitting the engagement hole around the engaging projection for securing the cover to the base plate. The elastic pieces abut the stopper wall so that a backlash between the cover and the base plate is absorbed.

Even though prior art gearshift cover assemblies allow for a quick assembly, they actually do not provide an automatic adjusting of the shifter bezel to the base and the console and fail to accommodate tolerances, particularly the play existing between the gearshift assembly and the console, especially after several disassembling and assembling operations of the shifter bezel in processes of maintenance and/or repair of the gearshift assembly.

SUMMARY OF THE INVENTION

An object of the present invention is providing a cover assembly for a motor vehicle gearshift assembly which overcomes the prior art disadvantages, particularly those related to reaching a suitable fixing of the shifter bezel in the console of the gearshift assembly of the vehicle, and providing further advantages which may be described hereinafter.

A further object of the invention is a gearshift assembly of a motor vehicle comprising a cover assembly as described herein.

Yet another object of the invention is a method for assembling of a cover assembly in a motor vehicle gearshift assembly.

With regard to the cover assembly of the invention, it comprises a shifter bezel that can be moved between two end positions relative to a base that is fixed to the motor vehicle. The base can be moved along a distance of about 15 mm from one first position to another second, opposite position.

The cover assembly is provided with biasing means, such as for example a torsion spring, for biasing said shifter bezel to one of said end positions.

There is also provided locking means for locking the shifter bezel at any position, between said two end positions within a preset displacement range, with respect to the base.

Thus, the shifter bezel may be automatically self-adjusted in the vehicle console through the biasing means. Once the shifter bezel has been properly fitted, its relative position may be easily fixed by the locking means.

There is also provided cams for suitably performing such self-adjustment. The cams cooperate with the biasing means such that the biasing means act on the respective cams causing them to be rotated and therefore forcing the shifter bezel to be moved away to the base. Cams may act directly on the shifter bezel by the action of said biasing means.

The shifter bezel includes extensions (for example, four) each provided with a groove. Each groove may have an open end and they may be formed of nonparallel walls for facilitating operation. A shaft element is allowed to run inside and along the groove. The shaft element may be part of the base, for example formed integral therewith and it may be externally threaded at one end thereof. The groove-shaft element assembly allows for a guided displacement of the shifter bezel relative to the base between the two end positions. The extensions may include a stop projection abutting a wall in the extensions of the base as the bezel is moved away from the base, therefore for preventing the shifter bezel from being fully detached from the base.

As noted above, locking means are provided for locking the shifter bezel to the base once the shifter bezel has been already fitted therein correctly in the console, that is when the bezel fully abuts the console. For this purpose, said locking means comprise a locking member which rotation prevents the relative displacement of the bezel. The locking member may be adapted to be threadably engaged on the threaded shaft element of the base. The locking member may be a wing nut. As the wing nut is threaded on the shaft element, it acts on the respective cam preventing it from being rotated and therefore locking the shifter bezel in position relative to the base.

As to the method according to the invention, it allows assembling the above disclosed cover assembly in a motor vehicle gearshift assembly. The method comprises the steps of fitting the console of the vehicle over the cover assembly and then releasing the locking means so that the shifter bezel automatically fits in said console, that is, the bezel is caused to be moved away from the base towards the console by the action of the biasing means. When this is carried out, the locking means may be actuated again for fixing the shifter bezel in a final, working position relative to the base when properly fitted in the console.

An initial step may be performed consisting in fixing the base of the cover assembly to the motor vehicle. A second step may be further carried out in which the locking means are release the bezel is pushed against the action of the biasing means for fixing the shifter bezel in the base until the shifter bezel is in a position near the base (as in FIG. 4) and locking the bezel to the base by actuating said locking means in said position.

Since the shifter bezel can be moved between two end positions relative to a base that is fixed to the motor vehicle, the shifter bezel may be automatically self-adjusted in the vehicle console through the biasing means. Once the shifter bezel has been properly fitted, its relative position may be easily fixed by above mentioned locking means. This also allows different magnitudes of gaps to be compensated in each of the four shifter bezel extensions since such extensions are independently pushed upward.

Bezel locking withstands pushing of buttons in the bezel upper portion, once the shifter bezel is installed in the vehicle.

With the aforedescribed cover assembly of the invention, an effective fastening of the shifter bezel in the base is achieved. With such a cover assembly, dimensional variations between the base and the shifter bezel are automatically corrected, making the assembly more accurate. The cover assembly may be therefore fitted in a wider range of motor vehicles.

BRIEF DESCRIPTION OF THE DRAWINGS

A particular embodiment of a cover assembly for a motor vehicle gearshift assembly according to the present invention will be described in the following, only by way of non-limiting example, with reference to the appended drawings, in which:

FIG. 6 is a fragmentary close up perspective view of the cover assembly shown the locking means in detail.

DETAILED DESCRIPTION OF PARTICULAR EMBODIMENTS

Figure 1:
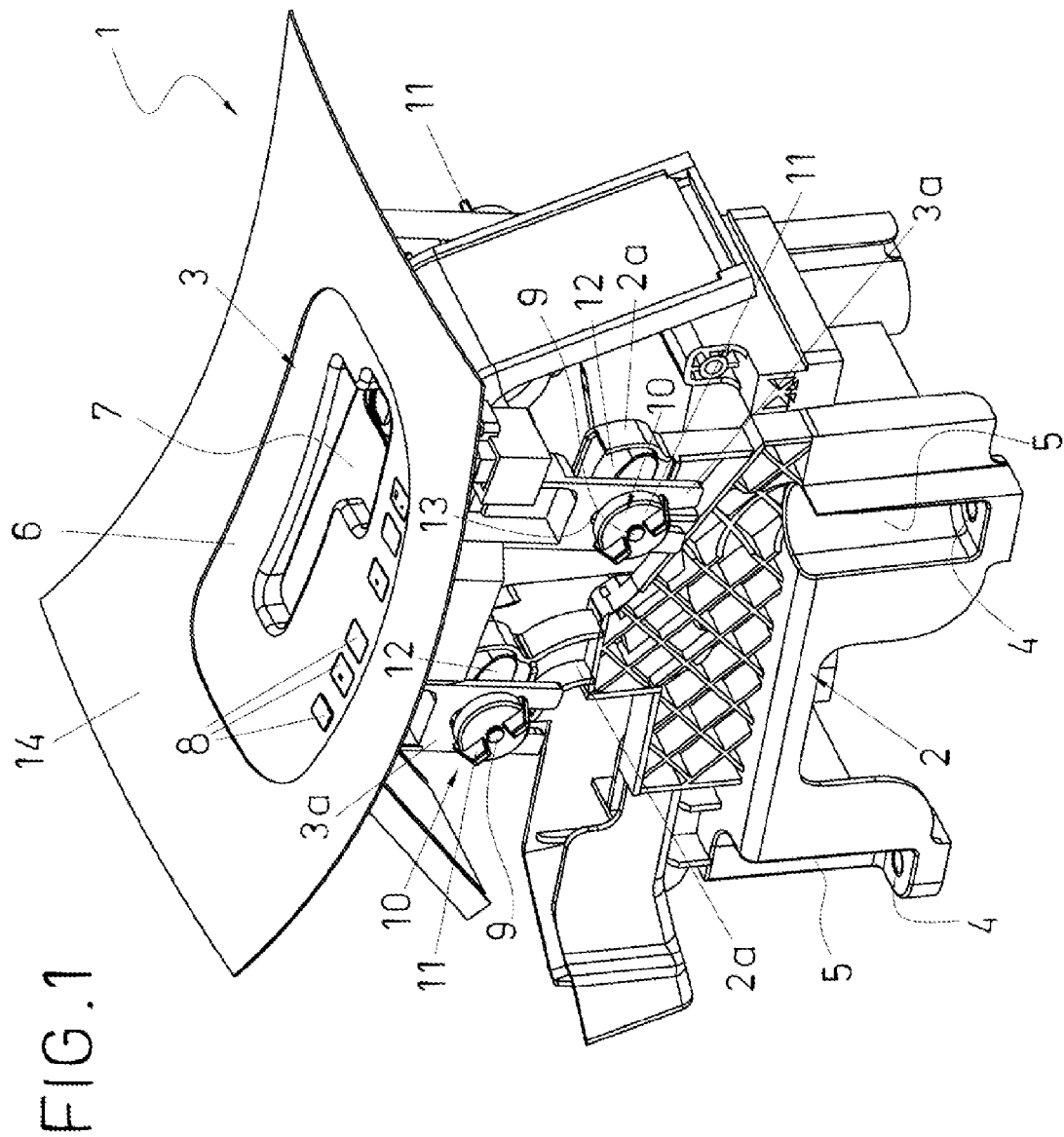
FIG. 1 is a perspective view of one embodiment of a full cover assembly according to the invention.
Figure 2:
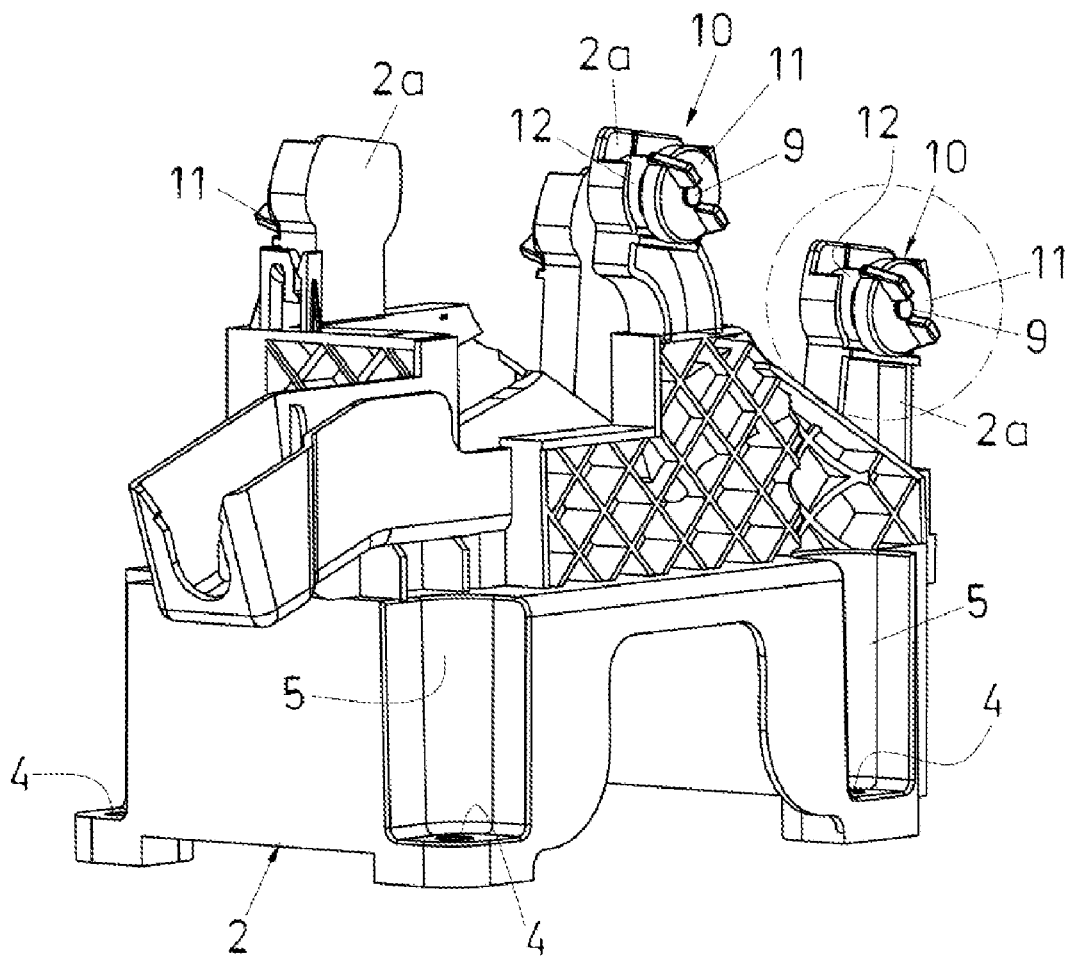
FIG. 2 is a perspective view the cover assembly in FIG. 1 in which only the base is shown.
Figure 2A:
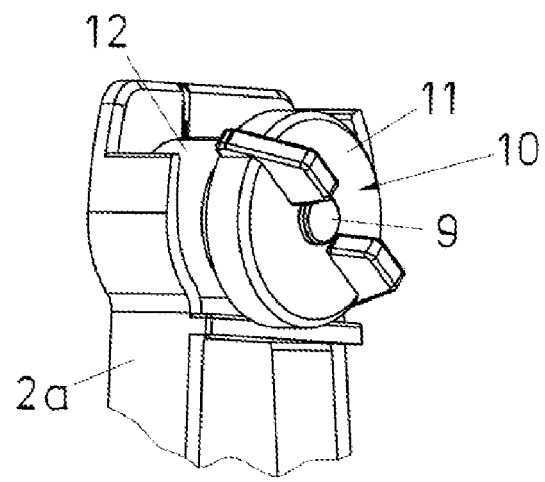
FIG. 2a is a close-up view of the highlighted area in FIG. 2 corresponding to one of the extensions of the base with a wing nut screwed on a shaft element thereof around which a cam is inserted.

Figures show a cover assembly which has been generally indicated at 1. The cover assembly 1 is intended to be mounted on a motor vehicle gearshift assembly for concealing the parts therein.

The cover assembly 1 mainly comprises a base 2 and a shifter bezel 3 intended to be fitted in a vehicle console 14.

The base 2 of the cover assembly 1 is fixed to the motor vehicle, for example by fastening bolts (not shown) passing through corresponding through holes 4 formed on depressed portions 5 in the base 2.

The shifter bezel 3 (as shown in FIG. 1) is a substantially flat, rectangular plate element 6 having a central groove guide 7 for guiding the gearshift lever (not shown) as it is moving therethrough. The outer surface of the element 6 has indications 8 for the user about the gearshift status.

The shifter bezel 3 can be moved between two end positions (upper and lower) relative to the base 2. One exemplary travel stroke of the bezel 3 would be of the order of 15 mm.

The base 2 remains, as stated above, fixed to the motor vehicle. On the other hand, the shifter bezel 3 is provided with corresponding extensions 3a (see FIG. 1) that extend in a substantially perpendicular direction thereto as shown. Extensions 3a may be part of either the shifter bezel 3 or of a block element on which the shifter bezel 3 is attached.

Figure 3:
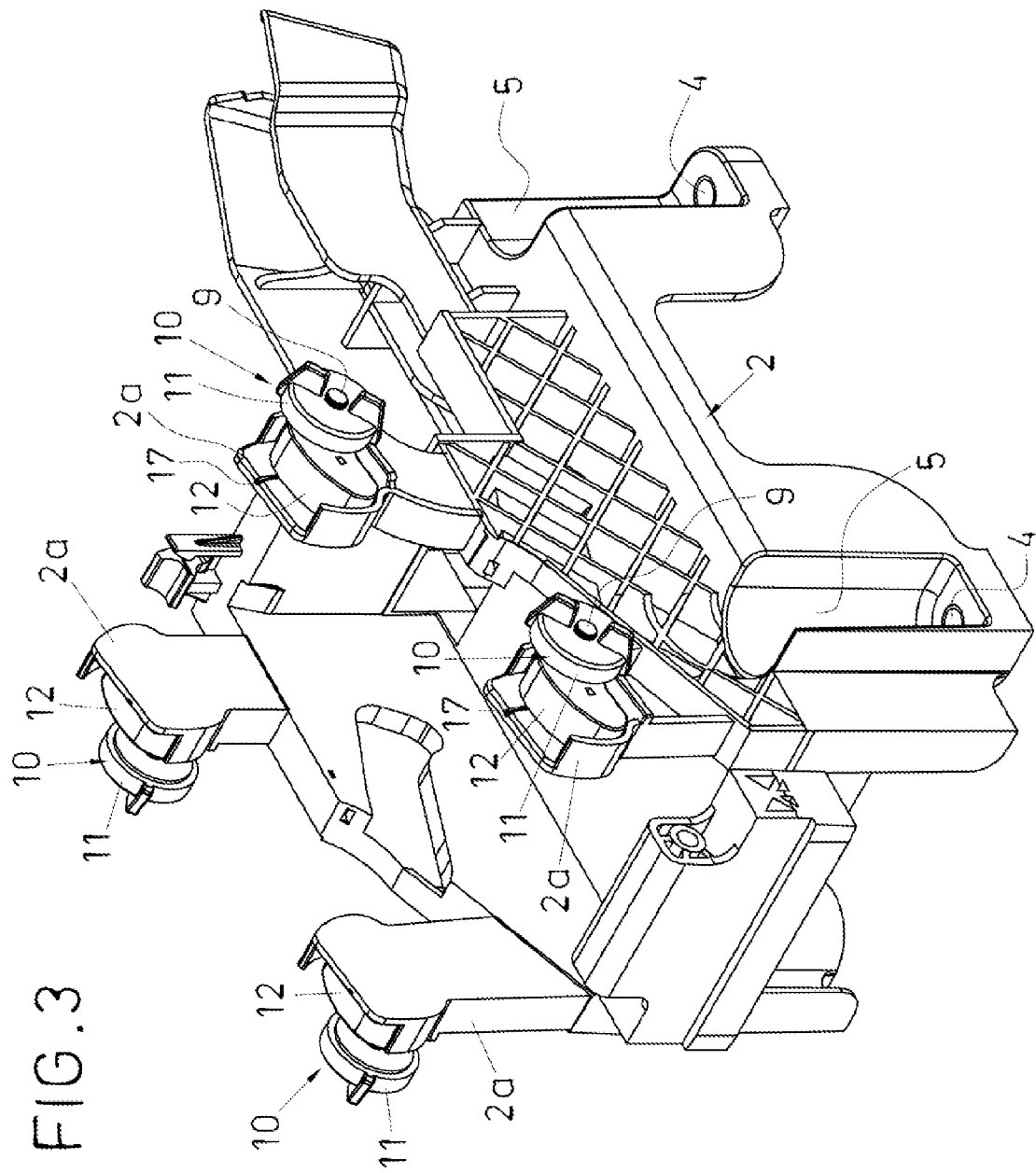
FIG. 3 is a perspective view the base of the cover assembly as in FIG. 2 in which cams can be best viewed.
Figure 4:
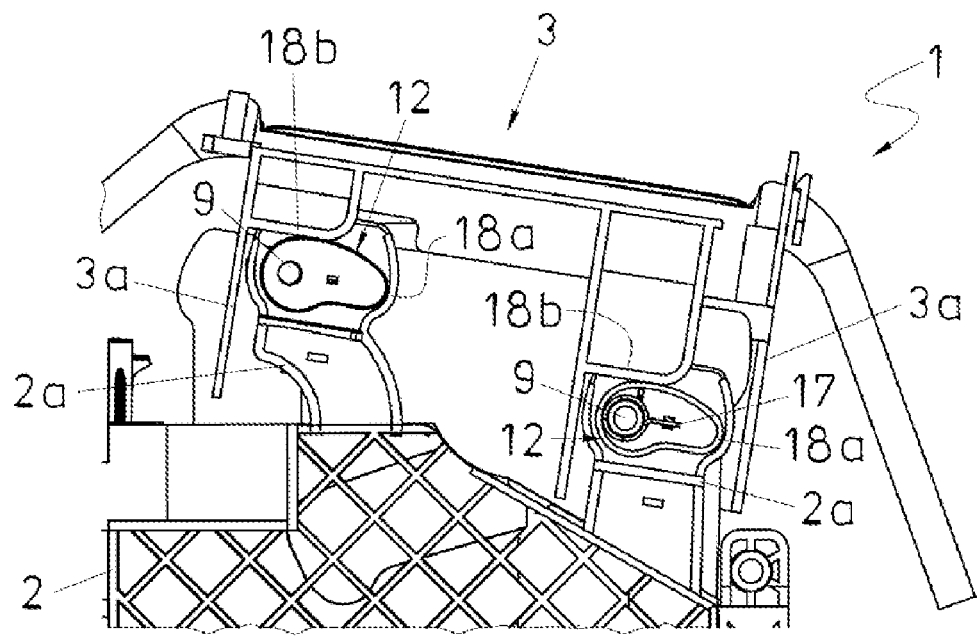
FIG. 4 is a fragmentary elevational view of the cover assembly in which the shifter lever is in a most adjacent position to the base, the cover assembly being depicted without the locking means for best viewing the cams.
Figure 5:
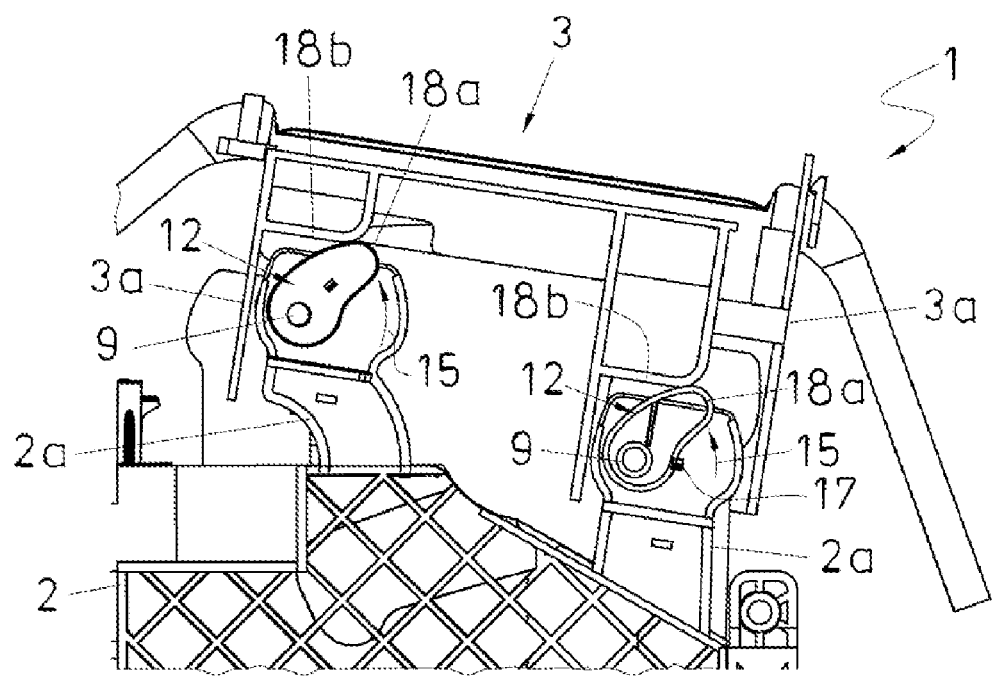
FIG. 5 is a fragmentary elevational view of the cover assembly as in FIG. 4 but in which the shifter lever is distant from the base.

Referring to FIGS. 4 and 5 of the figures, biasing means are provided in the cover assembly 1 for forcing the shifter bezel 3 and the base 2 to be moved away from each other. In the embodiment shown, such biasing means are in the form of a torsion spring 17 that is fitted around a shaft element 9. The shaft element 9 is externally threaded at one end thereof and it is formed in respective extensions 2a in the base 2. Cams 12 rotatably mounted on the corresponding shaft elements 9 are thus biased in the direction indicated at 15 by the torsion spring 17 such the shifter bezel 3 tends to move away from the base 2. As shown in FIG. 3, extensions 2a in the base 2 are so shaped such that a housing is formed therein for accommodating said cams 12.

In order to retain the shifter bezel 3 in position relative to the base 2 when positioned in one relative desired position in the console 14 of the motor vehicle, locking means 10 are further provided in the cover assembly 1. The locking means 10 comprise respective wing nuts 11 adapted to be threadably engaged on the shaft elements 9 of the base 2. As the wing nuts 11 are threaded on the respective shaft elements 9, the respective cams 12 are constrained thus preventing them from being rotated and therefore locking the shifter bezel 3 in position relative to the base 2. It is to be noted that although in the embodiment disclosed the shaft element 9 is formed in respective extensions 2a in the base 2, other possible embodiments are possible in which, for example, the shaft element 9 is be integral with the wing nut 11 and it is to be threadably fitted into a threaded hole formed in the extension 2a of the base 2.

The extensions 3a of the shifter bezel 3 are each provided with a groove 13 which may be seen in FIG. 6. Each groove 13 has an open end (not shown) so that two nonparallel branches are formed for facilitating insertion of the shaft elements 9 therealong. The groove-shaft element assembly 13, 9 allows for a guided displacement of the shifter bezel 3 relative to the base 2.

Referring to said FIG. 6, stop projections 16 are provided at the end of the inner portion of the branches of the respective extensions 3a in the bezel 3. The stop projections 16 abuts a wall 16a in the extensions 2a of the base 2 as the bezel 3 has been moved a distance away from the base 2, therefore preventing the shifter bezel 3 from being fully detached from the base 2.

For assembling the cover assembly 1 in a motor vehicle gearshift assembly the base 2 of the cover assembly 1 is first fixed to the vehicle. The shifter bezel 3 is in a position near the base 2 (that is, in a lower position, as shown in FIG. 4). Wing nuts 11 are then released for causing the shifter bezel 3 to be moved away from the base to a second, upper position, as shown in FIG. 5, by the torsion springs 17 that bias the cams 12 causing them to be rotated in the direction indicated at 15 in FIG. 5. The shifter bezel 3 is thus forced to move away from the base 2 as the active end 18a the cams 12 urge against an inner portion 18b of the extensions 3a of the shifter bezel 3 causing the shifter bezel 3 to be pushed upwardly and become automatically fitted in the desired position in the console 14. Finally, wing nuts 11 are then screwed up for fixing the shifter bezel 3 in a final, working position relative to the base 2.

Modifications considered as convenient may be introduced in the cover assembly for a motor vehicle gearshift assembly described herein provided that the essence of the invention that is summarized in the following claims is not altered.

The invention claimed is:

1. A cover assembly for a motor vehicle gearshift assembly comprising a shifter bezel movable between two end positions relative to a base fixed to the vehicle, the cover assembly comprising biasing means for biasing the shifter bezel to one of said end positions and locking means for locking the shifter bezel at any position between said two end positions with respect to the base, said biasing means acting on at least one cam whose rotation causes the shifter bezel to be moved away relative to the base.

2. A cover assembly as claimed in claim 1, wherein said cam acts on the shifter bezel by the action of said biasing means.

3. A cover assembly as claimed in claim 1, wherein said biasing means comprise a torsion spring.

4. A cover assembly as claimed in claim 1, wherein said shifter bezel comprises extensions having a groove inside of which a shaft element is allowed to run for guided displacement of the shifter bezel between said two end positions relative to the base.

5. A cover assembly as claimed in claim 4, wherein said groove is formed of nonparallel walls at least in a portion of the length of the nonparallel walls.

6. A cover assembly as claimed in claim 4, wherein said extensions include a stop projection intended for abutting a wall in said base as the bezel has been moved a distance away from the base, preventing the shifter bezel from being fully detached from the base.

7. A cover assembly as claimed in claim 1, wherein said locking means of the shifter bezel to the base comprise a locking member which rotation prevents the relative displacement of the shifter bezel.

8. A motor vehicle gearshift assembly comprising a cover assembly, the cover assembly comprising a shifter bezel movable between two end positions relative to a base fixed to the vehicle, and biasing means for biasing the shifter bezel to one of said end positions and locking means for locking the shifter bezel at any position between said two end positions with respect to the base with said biasing means acting on at least one cam whose rotation causes the shifter bezel to be moved away relative to the base.

\* \* \* \* \*